April 5, 1960  E. H. SOUTHWELL  2,931,541

DISTRIBUTING HEAD FOR CONTAINER

Filed Aug. 22, 1955

EDWARD H. SOUTHWELL,
INVENTOR.

BY R. E. Geaugue

ATTORNEY.

United States Patent Office 2,931,541
Patented Apr. 5, 1960

2,931,541

DISTRIBUTING HEAD FOR CONTAINER

Edward H. Southwell, Los Angeles, Calif.

Application August 22, 1955, Serial No. 529,850

2 Claims. (Cl. 222—498)

The present invention relates to a distributing head for a seasoning shaker and more particularly to a distributing head which can be shifted from an open to a closed position.

Seasoning shakers of the type presently in use have several objectionable features which are inherent in their design. For instance, no easy or convenient provision is provided for sealing the distributing head of the shaker so that foreign material will not enter the shaker through its distributing head and therefore adulterate the seasoning. It will be appreciated that this is a rather serious consideration especially in restaurants where the traffic is rather heavy and conditions for causing adulteration of the seasoning is more favorable than for instance in the home. A further objection of seasoning shakers presently in use is that it is relatively difficult and very inconvenient to remove the distributing head. Many times, for instance in cooking, it is advantageous if the distributing head can be removed so that a relatively large amount of seasoning can be removed from the container with a spoon or other like device. The present shaker usually has a distributing head which is threadedly received by the container so that it is necessary to unscrew the same before a spoon or like device can be inserted into the container. The distributing head of the present invention consists of two components which are movable one relative to the other so as to position the head either in a closed position wherein the seasoning cannot be shaken out of the shaker or in an open position wherein it is used in the conventional manner. The distributing head is also so constructed as to be readily and easily secured to the container while at the same time being easily removed therefrom so that in use it is an extremely easy matter to remove the head so that the seasoning can be removed from the container with a spoon or other like device.

The primary object of the present invention therefore is to provide an improved shaker for seasoning and like products.

Another object of the present invention is to provide a distributing head for a seasoning shaker which can be readily positioned either in a sealed or open position.

A further object of the present invention is to provide a distributing head which can be readily attached to or removed from a container so that easy access can be had to the contents of the container.

Further objects and advantages of the present invention will be readily apparent to those familiar with the art upon perusal of the following description and drawings in which:

Fig. 1 is a perspective view of a seasoning shaker embodying the principles of the present invention.

Referring to Fig. 1 of the drawings the number 10 broadly designates a suitable container which can be formed of glass or plastic or any other suitable material and a distributing head 11 which is carried over the opening of the container 10. The container is the type commonly employed for carrying a powdered or granular seasoning such as salt or pepper and the head 11, as will be more fully appreciated hereinafter, permits the seasoning to be shaken out of the container when in one or its open position and seals the seasoning in the container even if the container is shaken or is dropped when in its other or closed position.

Figure 4:
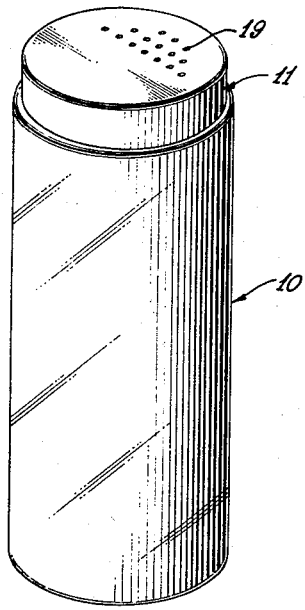
Fig. 4 is a view similar to Fig. 3 showing the distributing head in its closed position.
Figure 3:
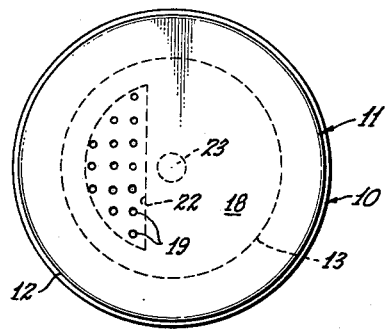
Fig. 3 is a top view looking in the direction of line 3—3 of Fig. 2 slightly reduced in size, showing the distributing head in its open position.
Figure 4:
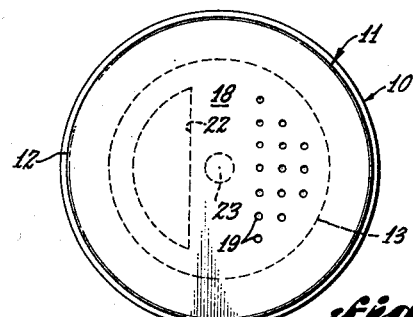
Figure 2:
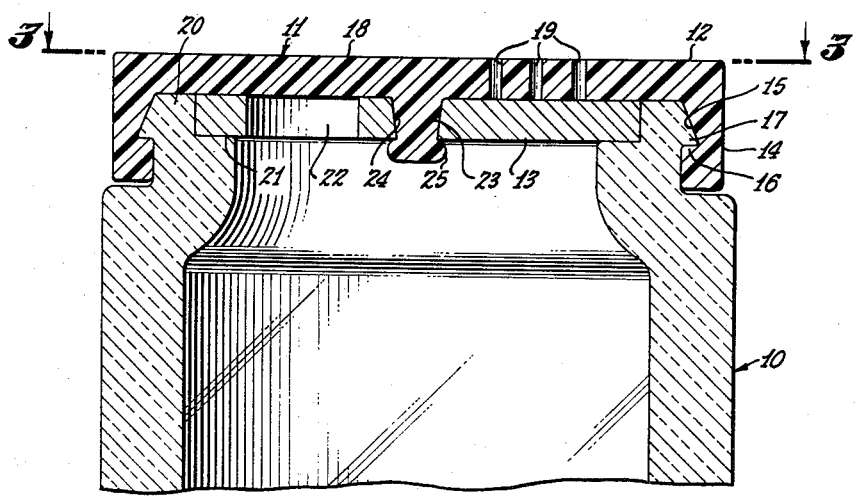
Fig. 2 is a vertical sectional view, with parts removed and slightly enlarged, of the shaker shown in Fig. 1.

Referring now particularly to Figs. 2, 3 and 4 of the drawings, the distributing head 11 comprises a top 12 and a liner insert 13, the top 12 being preferably formed of a plastic material such as polyethylene or polystyrene or any other suitable material of this type. The top 12 consists of a peripheral rim 14, the inner surface of which is formed with a groove 15 and a projection or rim 16 shaped to receive a bead 17 formed on the neck of container 10. It will be appreciated that the projection 16 has substantially the same depth as the bead 17 and that the bead 17 is so received in rim 14 as to lock top 12 to container 10 while still permitting the top to be easily turned relative to the container. It will also be appreciated that a plastic such as polyethylene or polystyrene is sufficiently resilient to enable the rim 14 to be easily snapped over bead 17 and to be easily removed therefrom and that a plastic of this type is easily turnable on glass or any other plastic material if, for instance, the container was also formed of plastic.

The rim 14 is interconnected by a top wall 18 which has formed therein a plurality of openings 19, these openings being arranged in a half-moon configuration to one side of the center of wall 18.

The opening of the neck of the container is defined by a rim 20 and a shoulder 21 and an insert 13 is so shaped as to be snapped into the container opening. The insert is preferably formed with an outside diameter which is slightly larger than the inside diameter of rim 20 so that the insert must be forced against the inner periphery of rim 20 and consequently fits tightly thereagainst. The insert is located against the shoulder 21 and can be formed of any suitable rigid or semi-rigid material such as plastic or cardboard. A cutout 22 is formed in the insert 13 which is also half-moon shaped in configuration and located to one side of the center of insert 13.

In actual manufacture it is preferable to define cutout 22 by a score line or perforation so that the shaker can be shipped with the insert 13 as a solid piece, the cutout 22 being formed just prior to use by pushing out the material defined by the perforations or score line. This practice obviates any spilling of the seasoning out of the container in the event the distributing head happens to be in its open position during the time it is being shipped, as will be more fully appreciated hereinafter.

The top wall 18 of top 12 has a downwardly depending projection 23 located in the center thereof and the insert has an opening 24 formed therein which receives the projection. The end of the projection is subjected to a heated tool or rod so as to form an enlargement or shoulder 25 which locates and holds the liner 13 adjacent the top 12 while still permitting relative movement of the top with respect to the liner.

As previously suggested, the top 12 is easily turnable on the container 10 and since the openings 19 and the cutout 22 are both located to one side of the center, the openings 19 can be positioned on the opposite side of the center with respect to the cutout 22, see Fig. 4, It will be appreciated that with the distributing head in this position that the seasoning in the container cannot be shaken out of the head inasmuch as the openings 19 are sealed by the solid face of the insert 13. When the top is turned 180° the openings 19 are moved to a position wherein they are in alignment with the cutout 22 and the seasoning consequently can be shaken out through the openings. The projection 23 locates the insert in intimate relationship to the wall 18 so that seasoning can not filter between the wall 18 and the insert and then out openings 19 when the distributing head is in its closed position. Also, the insert 13 cannot move with top 12 when the top is turned by reason of the fact that the insert is force-fitted in the container.

Also as previously suggested, the top 12 can be easily removed from the container 10 so that a spoon or other like device can be inserted into the opening of the container whenever the user desires to use a relatively large amount of seasoning. To replace the distributing head on the bottle necessitates only a force sufficient to snap the rim 14 on the bead 17 and insert 13 between the rim 20.

What is claimed is:

1. A distributing head for a container comprising a top consisting of a peripheral rim and a connecting wall element, a substantially rigid liner element positioned adjacent said wall element within said rim and of the shape of and slightly larger than the opening of said container and force-fitted into said opening, one of said elements having a projection depending from the center thereof and freely rotatably received by the other of said elements and having an enlargement for holding said elements in adjacent relationship while preventing sagging of said liner whereby said liner will be moved in unison with said top from the open end of said container, said container having a bead formed on the periphery thereof adjacent the opening thereof and said rim having formed therein a groove shaped to receive said bead and said top being formed of material sufficiently resilient to permit said rim to be readily snapped on or off said bead and said bead being so shaped as to hold said top rotatably on said container against accidental displacement, one of said elements having formed therein a plurality of discharge openings arranged to one side of the center thereof and the other of said elements having formed therein a cutout located to one side of the center thereof whereby said discharge openings can be positioned in sealed or unsealed relation upon said top being turned in either direction relative to said liner.

2. A distributing head for a container comprising a top consisting of a peripheral rim and a connecting wall and a substantially rigid liner positioned adjacent said wall within said rim and of the shape of and slightly larger than the opening of said container and force-fitted into said opening, said container having a bead formed on the periphery thereof adjacent the opening thereof and said rim having formed thereon a groove shaped to accommodate said bead, said top being formed of material sufficiently resilient to permit said rim to be readily snapped on or off said bead, and said bead being so shaped as to hold said top rotatably on said container against accidental displacement, said wall having formed therein a plurality of discharge openings arranged in a half-moon shaped configuration to one side of the center thereof and said liner having formed therein a half-moon shaped cutout located to one side of the center thereof and said liner having formed therein a half-tioned in sealed or unsealed relation with respect to said liner upon said top being turned in either direction relative to said liner and said wall having a projection depending from the center thereof and rotatably received by said liner and having an enlargement for holding said liner adjacent said wall and for preventing sagging thereof and for causing removal of said liner with said top when said top is removed from said container.

References Cited in the file of this patent
UNITED STATES PATENTS

| | | |
|---|---|---|
| 131,744 | Cooley | Oct. 1, 1872 |
| 199,896 | Burger | Feb. 5, 1878 |
| 795,606 | Graham | July 25, 1905 |
| 1,733,053 | Crabbe | Oct. 22, 1929 |
| 2,319,252 | Monnet | May 18, 1943 |
| 2,551,203 | Wheaton | May 1, 1951 |
| 2,562,647 | Shaver | July 31, 1951 |
| 2,605,028 | Nyden et al. | July 29, 1952 |
| 2,780,395 | Schlabach et al. | Feb. 5, 1957 |
| 2,817,451 | Giles et al. | Dec. 24, 1957 |

FOREIGN PATENTS

| | | |
|---|---|---|
| 824,924 | Germany | Dec. 13, 1951 |